(12) United States Patent
Ethirajan et al.

(10) Patent No.: US 9,841,134 B2
(45) Date of Patent: Dec. 12, 2017

(54) SYSTEM MANAGING MOBILE SENSORS FOR CONTINUOUS MONITORING OF PIPE NETWORKS

(71) Applicant: GLOBALFOUNDRIES INC., Grand Cayman (KY)

(72) Inventors: Tamilmani Ethirajan, Bangalore (IN); Ninad D. Sathaye, Maharashtra (IN); Ashwin Srinivas, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 33 days.

(21) Appl. No.: 15/011,893

(22) Filed: Feb. 1, 2016

(65) Prior Publication Data

US 2017/0219157 A1    Aug. 3, 2017

(51) Int. Cl.
| | | |
|---|---|---|
| *F16L 55/26* | (2006.01) | |
| *H04B 1/3827* | (2015.01) | |
| *H04L 29/08* | (2006.01) | |
| *H04W 4/00* | (2009.01) | |
| *F16L 101/30* | (2006.01) | |

(52) U.S. Cl.
CPC ............ *F16L 55/26* (2013.01); *H04B 1/3827* (2013.01); *H04L 67/12* (2013.01); *H04W 4/005* (2013.01); *F16L 2101/30* (2013.01)

(58) Field of Classification Search
CPC .............................. F16L 55/26; F16L 2101/30
USPC .................................................... 340/870.07
See application file for complete search history.

(56) References Cited

U.S. PATENT DOCUMENTS

| | | | | |
|---|---|---|---|---|
| 4,560,931 A | * | 12/1985 | Murakami | G01M 3/005 324/220 |
| 7,024,314 B1 | * | 4/2006 | Stella | F16L 55/30 701/34.2 |
| 2015/0155920 A1 | * | 6/2015 | Talnishnikh | H04B 7/04 455/500 |
| 2015/0179044 A1 | * | 6/2015 | Wu | G08B 21/20 370/311 |

OTHER PUBLICATIONS

R. Wu et al., "Self-Powered Mobile Sensor for In-pipe Potable Water Quality Monitoring", 17th International Conference on Miniaturized Systems for Chemistry and Life Sciences Oct. 2013, pp. 14-16.

(Continued)

*Primary Examiner* — Qutbuddin Ghulamali
(74) *Attorney, Agent, or Firm* — Gibb & Riley, LLC; Michael J. LeStrange, Esq.

(57) ABSTRACT

Systems include, among other components, fixed and mobile sensors positioned within a pipe network containing a substance (such as a liquid, gas, or low-viscosity solid). In addition, systems include a mobile transceiver device positioned within the pipe network. The mobile transceiver device moves through the substance and the pipe network, and the mobile transceiver device is in wireless communication with the sensors. Systems also include a receiver that is external to the pipe network, and the receiver is in communication with the mobile transceiver device. In operation, the mobile transceiver device wirelessly receives sensor data from the sensors, the mobile transceiver device can aggregate the sensor data from multiple sensors, and the mobile transceiver device transmits the aggregated sensor data wirelessly to the receiver.

18 Claims, 8 Drawing Sheets

(56) References Cited

OTHER PUBLICATIONS

Mahima Suresh, et al;, "Towards a Cyber-Physical System for Continuous Monitoring of Water Distribution Systems", IEEE WiMob, Oct. 2014, pp. 570-577.
http://www.slate.com/blogs/future_tense/2013/04/08/sewer_robots_do_the_dirty_work.html, "Sewer Bots: Unsung Heroes of the Undergound", Jason Bittel, Apr. 8, 2013, pp. 1-11.
http://www.envirosight.com/index.php/crawlers/rovverx.html, "10 Reasons ROVVER X is the World's Top Inspection Crawler", Jan. 11, 2016, pp. 1-2.
http://www.sintef.no/en/news-from-gemini.no/robot-water-pipe-inspectors/, "Robot water pipe inspectors", Dec. 2, 2014, pp. 1-4.

* cited by examiner

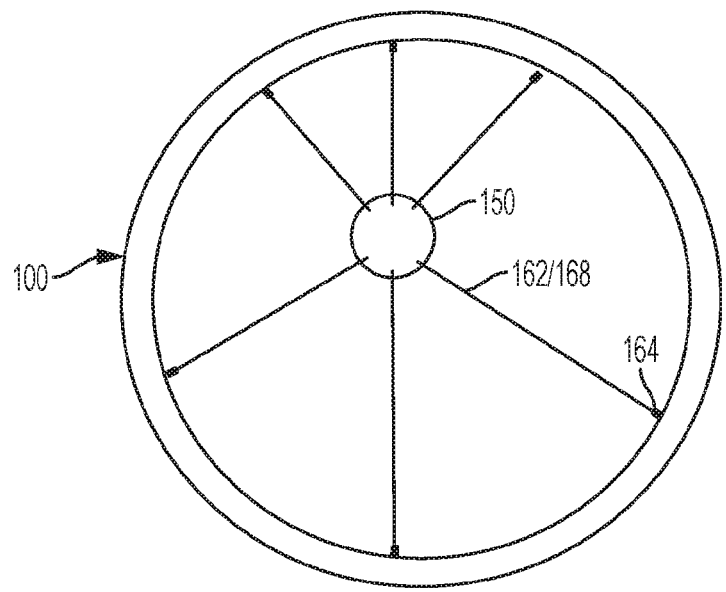
FIG. 7
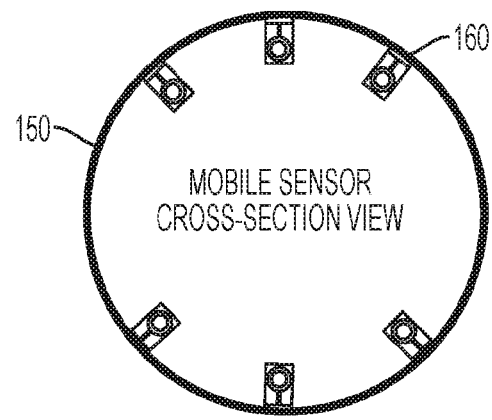
FIG. 8
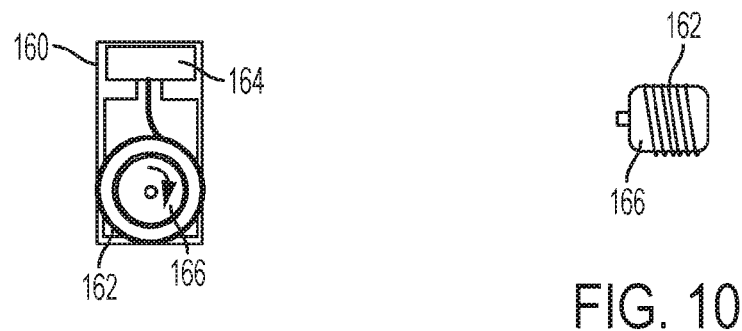
FIG. 9
FIG. 10

SYSTEM MANAGING MOBILE SENSORS FOR CONTINUOUS MONITORING OF PIPE NETWORKS

BACKGROUND

The present disclosure relates to systems that monitor pipe networks, and more specifically, to managing mobile sensors for continuous monitoring of pipe networks.

Pipes and the pipelines are commonly used to transport gases, liquids, and low-viscosity solids. In one example, natural gas, petroleum, and water pipe networks are typically vast (e.g., city-wide, state wide, country-wide). Fine-grained information (in terms of flow, pressure, and a host of liquid quality parameters) is used to achieve operational efficiency as well as better quality of service. Assets (e.g., pipes, pumps, nodes, etc.) are not always easy to physically access. With most pipe networks, automated sensors and other instrumentation are used for monitoring to make these systems more efficient; however, the cost of instrumentation and maintenance of the instrumentation are prohibitively high, especially in large metropolitan areas.

In view of this, mobile sensors have been proposed as an alternative. However, managing the mobile sensors within the network without manual intervention and without disturbing the flow pattern are strong challenges. In one example, mobile sensors travel (move by floating or being propelled) with the substance being transported within the pipe network to monitor the pipe network and the substance itself. Such mobile sensors can, for example, take the form of ball-shaped units with sensing electronics and energy harvesting (using electro-magnets, etc.) features. These mobile probes can be inserted into the pipe network at one location and be manually retrieved at downstream outlets. However, such mobile probes need to be retrieved manually at accessible locations, and underlying water flow should be suitably adjusted to prevent sensors from being stuck or reversed so as to guide the mobile sensors to appropriate locations for collecting, and this puts a constraint on their deployment. In addition, such use of mobile sensors is not ideal for continuous monitoring, as the mobile sensors may not report in real time, and because the readings from the sensors may only be obtained after the sensors have exited the outlets of the pipe network.

SUMMARY

Exemplary systems herein include, among other components, fixed and mobile sensors positioned within a pipe network containing a substance (such as a liquid, gas, or low-viscosity solid). In addition, these systems include a mobile transportation and transceiver device positioned within the pipe network. The mobile transportation and transceiver device moves through the substance and the pipe network, and the mobile transportation and transceiver device is in wireless communication with the sensors. Such systems also include a receiver that is external to the pipe network, and the external receiver is in communication with the mobile transportation and transceiver device. In operation, the mobile transportation and transceiver device wirelessly receives sensor data from the sensors, the mobile transportation and transceiver device can aggregate the sensor data from multiple sensors, and the mobile transportation and transceiver device transmits the aggregated sensor data wirelessly to the receiver.

Also, the mobile transportation and transceiver device can include (among other components) an internal compartment and an opening on its exterior that provides access to the internal compartment, where the internal compartment is sized to hold the sensors. The mobile transportation and transceiver device can, for example, transport the sensors within the pipe network. Further, there can be charging devices within the internal compartment, and the charging devices can recharge the sensors. Additionally, a conveyor system can be included within the internal compartment, where the conveyor system moves the sensors within the internal compartment and controls the release of the sensors to the environment external to the mobile transportation and transceiver device.

The mobile device can also include an internal processor and a transceiver operatively (meaning directly or indirectly) connected to the processor. The processor can direct movement of the mobile transportation and transceiver device, relative to the pipe network and the sensors, to optimize the amount of sensor data received and transmitted to the external receiver. The transceiver can be in wireless communication with the sensors positioned within the pipe network and in wireless communication with the external receiver. In specific implementations, the transceiver wirelessly receives sensor data from the sensors, the processor aggregates the sensor data from multiple sensors to generate aggregated sensor data, and the transceiver transmits the aggregated sensor data wirelessly to the receiver.

Some of the sensors are mobile sensors that move through the substance and the pipe network. The mobile sensors and the mobile transportation and transceiver device can have different exterior shapes and/or different buoyancies, and the different exterior shapes and/or different buoyancies cause the mobile sensors and the mobile transportation and transceiver device to travel differently within the same flow rate of the substance in the pipe network. Thus, the different exterior shapes and/or different buoyancies can cause the mobile sensors to experience lower forces (less vibrations, less G-forces, etc.) relative to the mobile transportation and transceiver device within the same flow rate of the substance in the pipe network. Also, the different exterior shapes and/or different buoyancies can cause the mobile transportation and transceiver device to travel at a higher speed when operating a propulsion device, relative to the mobile sensors operating a similar propulsion device, within the same flow rate of the substance.

In some implementations, the mobile transportation and transceiver device can include a temporary anchor. For example, the temporary anchor can be a physical anchor temporarily attaching to the pipe network or a magnetic anchor temporarily attaching to the pipe network, and the temporary anchor selectively maintains the mobile transportation and transceiver device at a fixed location within the pipe network irrespective of flow of the substance.

BRIEF DESCRIPTION OF THE DRAWINGS

The embodiments herein will be better understood from the following detailed description with reference to the drawings, which are not necessarily drawn to scale and in which:

FIGS. 7-14 are schematic diagrams illustrating anchor systems of self-propelled mobile devices herein.

DETAILED DESCRIPTION

Figure 1:
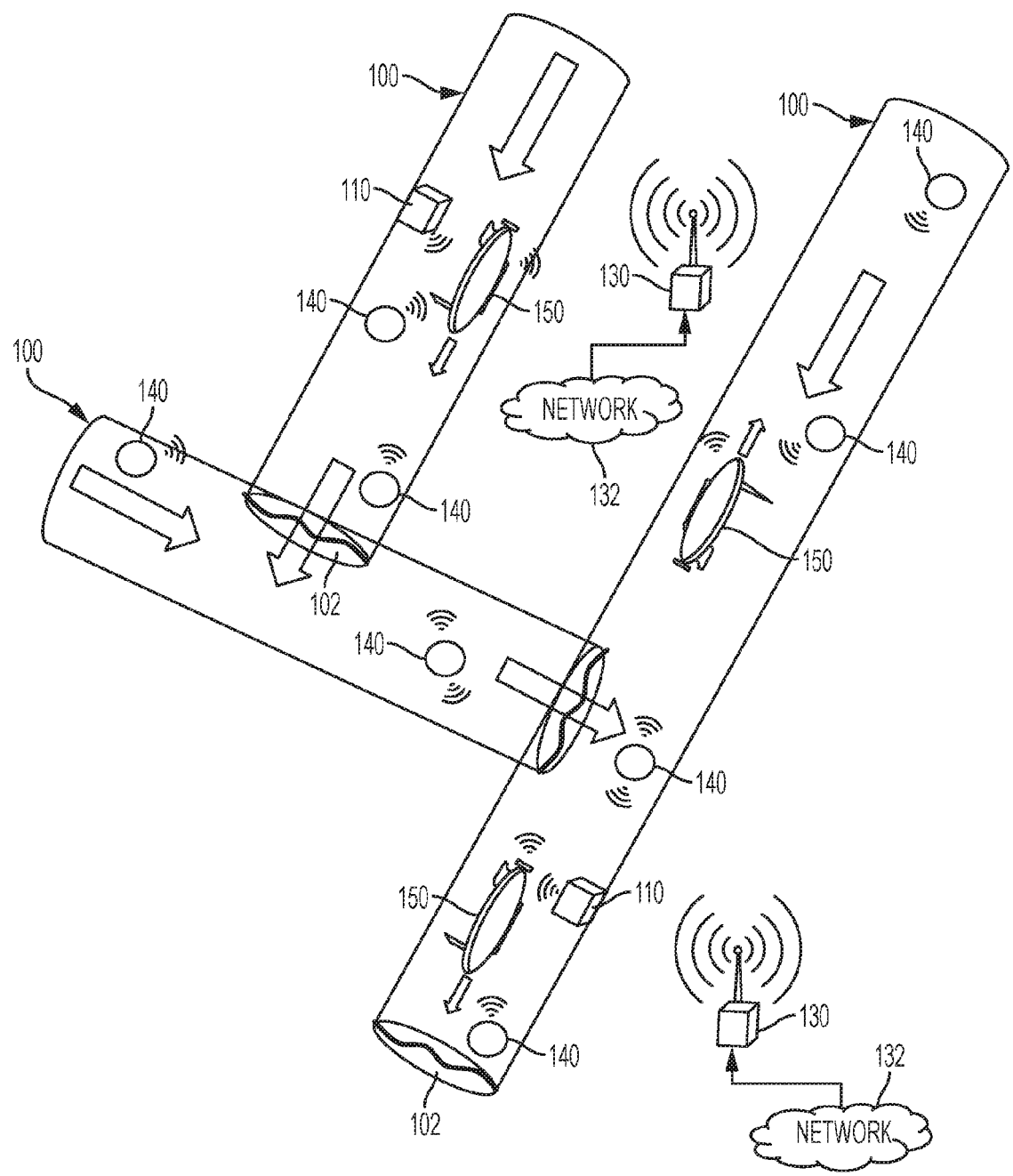
FIG. 1 is a schematic diagram illustrating systems herein.

As mentioned above, mobile probes that are inserted into a pipe network at one location and manually retrieved at outlets suffer from many limitations. In view of this, the systems and methods herein utilize a separate self-propelled mobile device that can communicate with fixed and mobile sensors within the pipe network to provide wireless communication between sensor units and backend systems, as well as global processing to modulate liquid flow to prevent sensors from getting stuck, and to aid in retrieval.

By utilizing a separate self-propelled mobile device for facilitating communication between cloud-based backend systems and the various sensors within the pipe network, the mobile sensors themselves can be made differently to allow the entire system to operate more efficiently. For example, the mobile sensors can be shaped and designed to prevent disturbing sensing and measurement electronics, to be optimized for minimized drag, best buoyancy, efficient transport, etc.

The self-propelled mobile device can be provided with propulsion capability to move against flow, which provides additional degrees-of-freedom to optimize overall system design. The self-propelled mobile device gathers mobile sensors and moves based on requirements against the flow of water in the pipe network. Analytics prevent movement of the self-propelled mobile device and mobile sensors into regions that are sub-optimal or non-recoverable.

The self-propelled mobile device has a low drag shape to minimize energy requirements, propulsion capability to move against flow of water, tendril-based mechanisms to deploy and retrieve mobile sensors, and mechanical braking mechanism to prevent movement with flow when required. More specifically, the self-propelled mobile device can have a hollow body to store sensor balls within the body (tube) and the ability to release sensors from the back (e.g., a first-in-first-out (FIFO) system). Additionally, the self-propelled mobile device can use a motor winding spooled thread with a magnet at the end which is selectively attachable to the pipe, to provide magnetic assisted braking at designated points along the pipeline, as well as a latching and docking mechanism for connection at static sensor points (e.g., for "parking" and charging). Also, the self-propelled mobile device can recharge the mobile sensors via contact, and this eliminates the need to design energy harvesting system within the mobile sensors, which simplifies the design and reduces the cost of mobile sensors.

Using the self-propelled mobile device allows for smaller sections of pipeline to be navigable, and the cloud-based solution orchestrates multiple self-propelled mobile devices and mobile sensors in order to achieve the shortest time to transport mobile sensors to desired locations against flow. The cloud-based solution also predicts the most efficient routes for self-propelled mobile devices based on historical data patterns, runs diagnostics and maintenance of static sensors, enables fine grain diagnostics on static sensor points, and prevents the self-propelled mobile device from entering non-recoverable or inefficient states.

FIG. 1 illustrates aspects of exemplary systems herein that include, among other components, fixed sensors 110 and mobile sensors 140 positioned within a pipe network 100 containing a substance 102 (such as a liquid, gas, low-viscosity solid and/or a combination of such materials). In addition, these systems include a self-propelled mobile transportation and transceiver device 150 positioned within the pipe network 100.

The self-propelled mobile transportation and transceiver device 150 moves through the substance 102 and/or the pipe network 100, either by floating in the substance 102 as it moves through the pipe network, or by moving with or against the flow of the substance 102 within the pipe network. Also, as illustrated by the wireless signal symbols in FIG. 1, the self-propelled mobile transportation and transceiver device 150 is in wireless communication with the fixed and mobile sensors 110, 140. Such systems also include a receiver 130 that is external to the pipe network 100, and the external receiver 130 is in communication with the self-propelled mobile transportation and transceiver device 150 and an external network 132. In addition, the self-propelled mobile transportation and transceiver device 150 can acquire (pick up), transport, and release the mobile sensors 140 from and to different locations within the pipe network 100.

In operation, the self-propelled mobile transportation and transceiver device 150 wirelessly receives sensor data from the sensors 110, 140. The self-propelled mobile transportation and transceiver device 150 can aggregate the sensor data from multiple sensors 110, 140, and the self-propelled mobile transportation and transceiver device 150 can transmit the aggregated sensor data wirelessly to the receiver 130.

As noted above, some of the sensors are mobile sensors 140 that move with or through the substance 102 and through the pipe network 100. The mobile sensors 140 and the self-propelled mobile transportation and transceiver device 150 can have different exterior shapes and/or different buoyancies, and the different exterior shapes and/or different buoyancies cause the mobile sensors 140 and the self-propelled mobile transportation and transceiver device 150 to travel differently within the same flow rate of the substance 102 in the pipe network 100. Also, the different exterior shapes and/or different buoyancies can cause the mobile sensors 140 to experience lower forces (less vibrations, less G-forces, etc.) relative to the self-propelled mobile transportation and transceiver device 150 within the same flow rate of the substance 102 in the pipe network 100. In addition, the different exterior shapes and/or different buoyancies can cause the self-propelled mobile transportation and transceiver device 150 to travel at a higher speed when operating a propulsion device, relative to the mobile sensors 140 operating a similar propulsion device, within the same flow rate of the substance 102.

These features allow the cloud-based solution (represented by the cloud network of computerized devices 132) to orchestrate the movement of multiple self-propelled mobile devices and mobile sensors in order to achieve the shortest time to transport mobile sensors to desired locations within the pipe network 100 (potentially against the flow of the substance 102), predict the most efficient routes for self-propelled mobile device based on historical data patterns, run diagnostics and maintenance of static sensors, enable fine grain diagnostics on static sensor points, and prevent the self-propelled mobile device from entering non-recoverable or inefficient sections of the pipe network 100.

Figure 2:
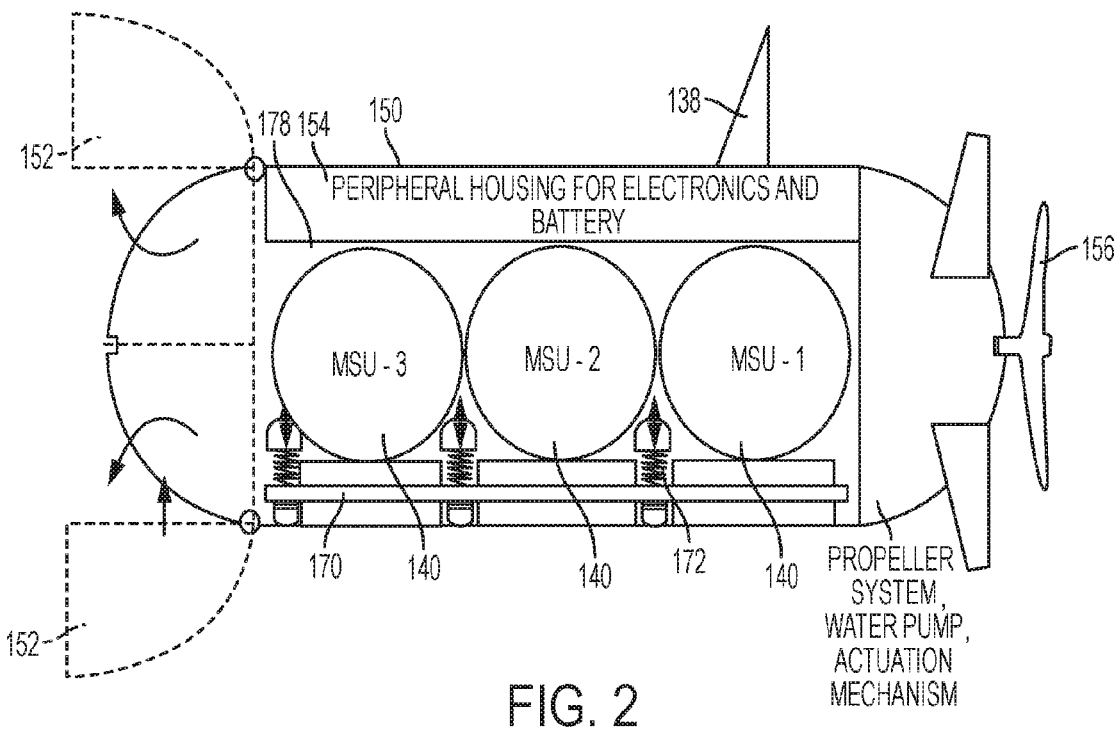
FIG. 2 is a cross-section side view schematic diagram illustrating self-propelled mobile devices herein.
Figure 3:
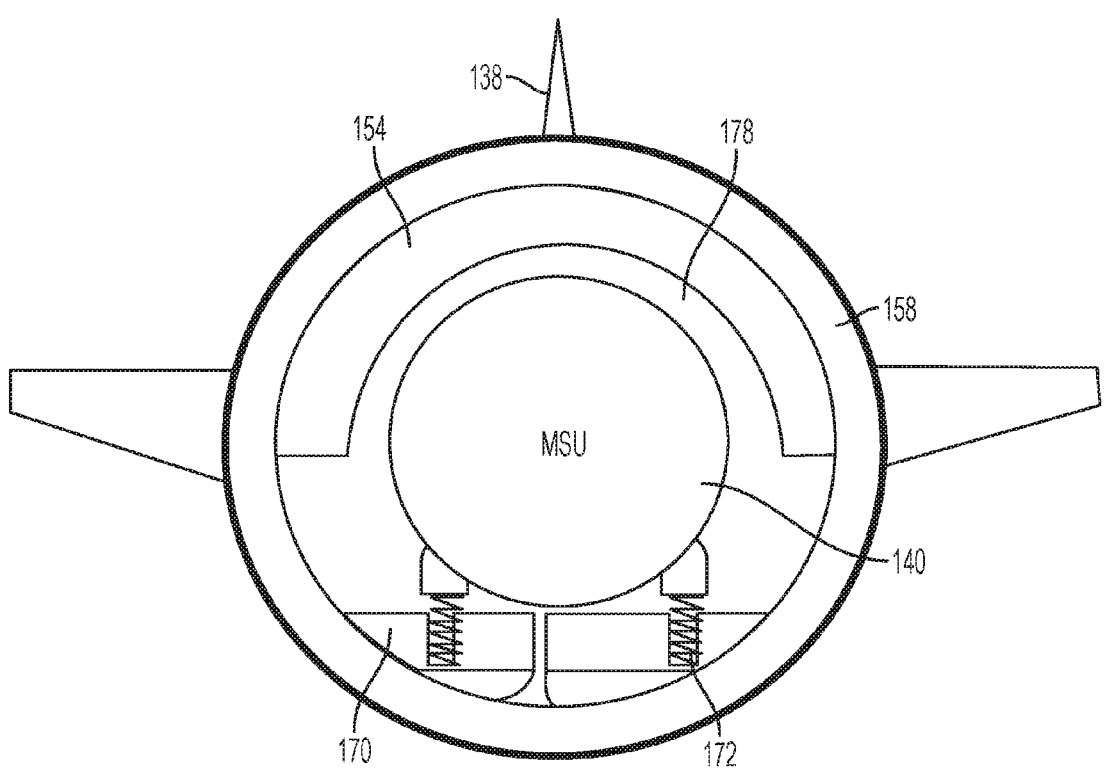
FIG. 3 is a cross-section end view schematic diagram illustrating self-propelled mobile devices herein.

As shown in cross-section side view in FIG. 2 and cross-section end view in FIG. 3, the self-propelled mobile transportation and transceiver device 150 can include (among other components) an internal compartment 178 and movable components or panels 152 that rotate to form an opening on the exterior of the self-propelled mobile transportation and transceiver device 150 (that is illustrated as a flower-pedal, or clam-shell opening in FIG. 2, but any form of opening could be utilized) that provides access to the internal compartment 178. As shown, the internal compartment 178 is sized to hold one or more of the mobile sensors 140. Further, the self-propelled mobile transportation and transceiver device 150 can include a conveyor system 170 (with spring loaded or hydraulic separators 172), and ballast tanks 158 to adjust attitude, orientation, and buoyancy. The self-propelled mobile transportation and transceiver device 150 moves through the substance 102 and/or the pipe network 100, either by floating in the substance 102 as it moves through the pipe network, or by moving with or against the flow of the substance 102 within the pipe network by operation of a propulsion device 156 (that can be any form of propulsion device, including a propeller system, impeller system (e.g., water pump), gas jets, actuators, etc.). Further, there can be charging devices 154 within the internal compartment 178, and the charging devices 154 can recharge the mobile sensors 140 while they are maintained within the internal compartment 178.

Figure 4A:
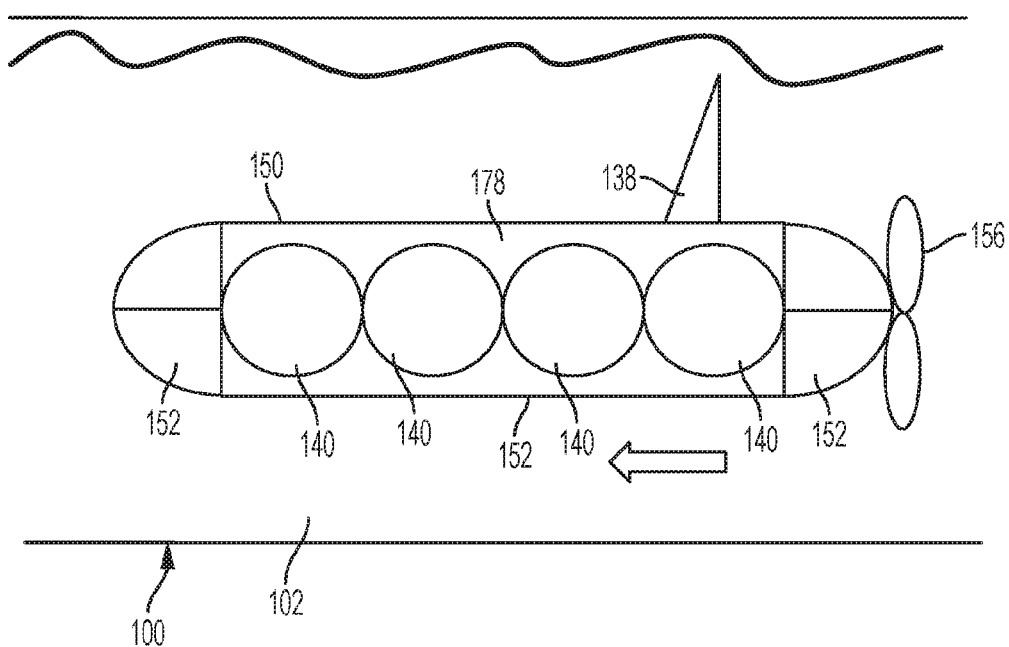
FIGS. 4A-4B are cross-section side view schematic diagrams illustrating self-propelled mobile devices herein.
Figure 4B:
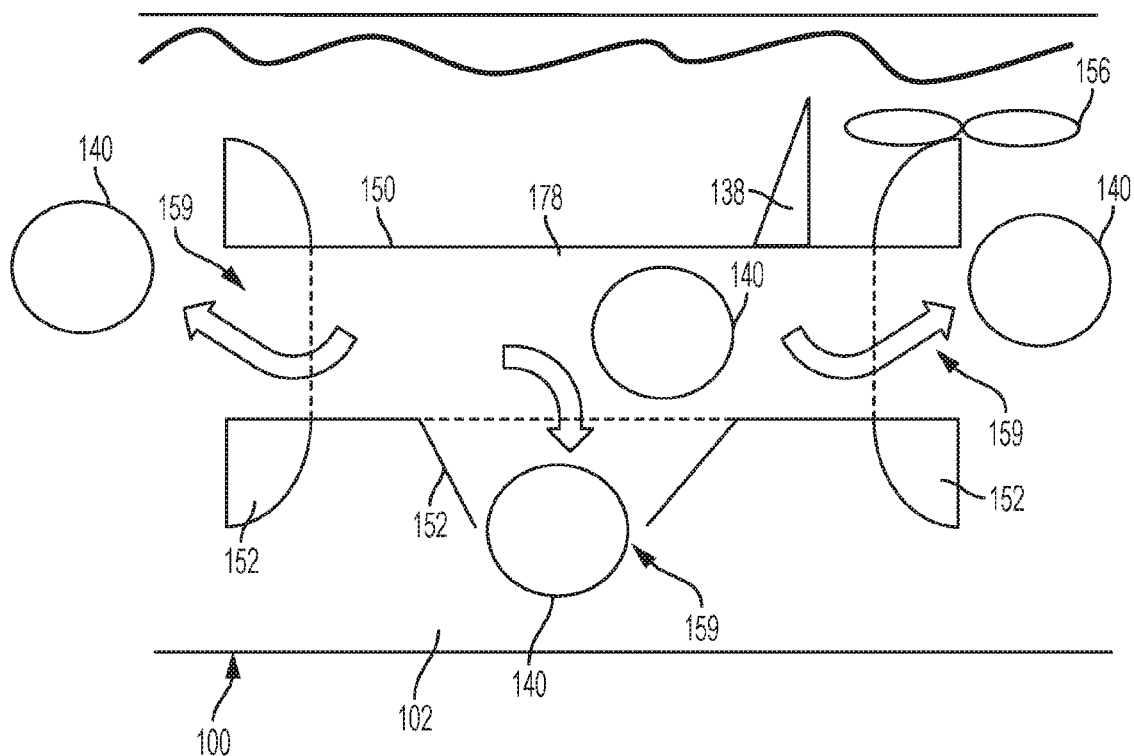

FIGS. 4A-4B also illustrate cross-section side views of the self-propelled mobile transportation and transceiver device 150 with four mobile sensors 140 within the internal compartment 178 (those ordinarily skilled in the art would understand any number of mobile sensors 140 could be included within the internal compartment 178, depending upon the size of the mobile sensors 140 and the size of the internal compartment 178). FIG. 4A illustrates the movable panels 152 in the closed position, which maintains the mobile sensors 140 within the internal compartment 178 while the self-propelled mobile transportation and transceiver device 150 moves through the pipe network 100. FIG. 4B illustrates the movable panels 152 rotated into the open position, which creates openings 159 that allows one or more of the mobile sensors 140 to be released from the internal compartment 178 of the self-propelled mobile transportation and transceiver device 150 into the substance 102 being transported by the pipe network 100.

The self-propelled mobile transportation and transceiver device 150 can, for example, transport the mobile sensors 140 within the pipe network 100 by moving within the pipe network 100 while the mobile sensors 140 are maintained within the internal compartment 178 (as shown in FIG. 4A).

Figure 5:
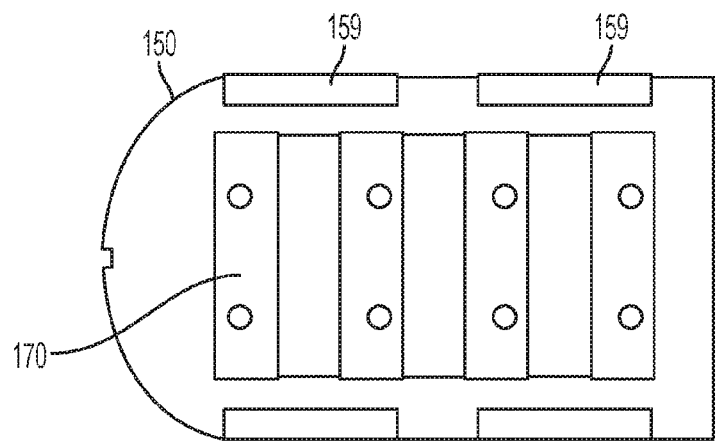
FIG. 5 is a cross-section top view schematic diagram illustrating self-propelled mobile devices herein.
Figure 6A:
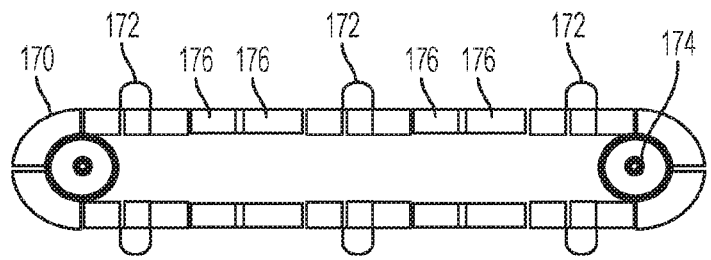
FIG. 6A-6C are schematic diagrams illustrating conveyor systems of self-propelled mobile devices herein.
Figure 6B:
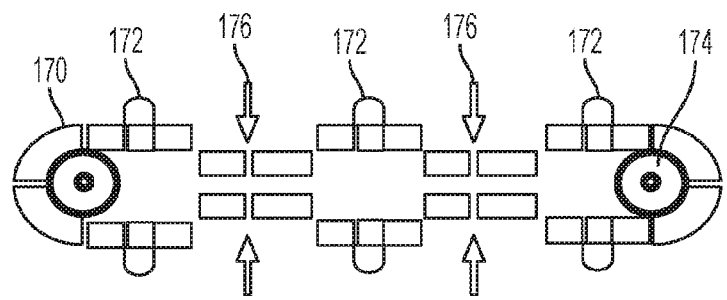
Figure 6C:
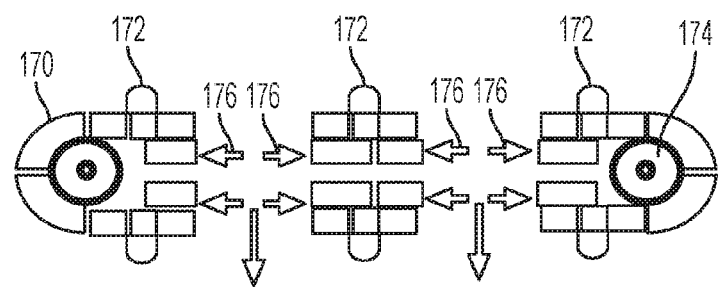

Additionally, as shown in cross-section top view in FIG. 5, and in side view in FIGS. 6A-6C, the conveyor system 170 can be included within the internal compartment 178 (such as a continuous belt 170 moved by rotation of one or more driven support rollers 174). As shown in FIGS. 5-6C, the conveyor system 170 moves the mobile sensors 140 within the internal compartment 178 and controls the release of the mobile sensors 140 to the liquid or gas environment 102 that is external to the self-propelled mobile transportation and transceiver device 150, through operation of the spring loaded or hydraulic separators 172 and operation of split segments 176 of the conveyor belt 170.

Therefore, as can be seen in FIG. 6A, all segments 176 of the conveyor belt 170 are aligned to maintain mobile sensors 140 in place. In order to release the mobile sensors 140 from the mobile transportation and transceiver device 150, in one example shown in FIG. 6B, the split segments 176 move (using actuators) toward the interior of the conveyor belt 170 loop (toward a line intersecting the axles of the support rollers 174, as shown by the upward and downward arrows); and then as shown in FIG. 6C, the split segments 176 move toward or away from the support rollers 174 (as shown by the horizontal arrows); and this allows the mobile sensors 140 to move in the direction shown by the downward arrows in FIG. 6C.

In some implementations, the self-propelled mobile transportation and transceiver device 150 can include a temporary anchor 160, as shown in FIGS. 7-12. For example, the temporary anchor 160 can be a physical anchor (such as a hook, screw, blade, etc.) temporarily attaching (screwing into or hooking into) to the surface of the pipe network 100 or a magnetic anchor (illustrated as element 164 in FIGS. 7, 9, and 12) that is used in situations where the pipe 100 is made of a material to which magnets attach (metals, such as iron, lead, steel, etc.). The temporary anchor 160 temporarily attaches to the pipe network 100, and this allows the temporary anchor 160 to selectively maintain the self-propelled mobile transportation and transceiver device 150 at a fixed location within the pipe network 100 irrespective of flow of the substance 102.

More specifically, as shown in FIGS. 7 and 8, the self-propelled mobile transportation and transceiver device 150 can include many anchor devices or units 160 located on the exterior of the self-propelled mobile transportation and transceiver device 150. For example, each anchor device 160 shown in FIG. 8 includes a motorized spool 166 of wire or thread 162, having a magnet 164 at the end of the wire 162. In this example, the magnets 164 magnetically attach to the pipe 100. Each of the motorized spools 166 unwinds enough wire 162 to allow the other magnets 164 of the other anchor devices 160 to also attach to the inside of the pipe 100 (as shown in FIG. 7).

Figure 11:
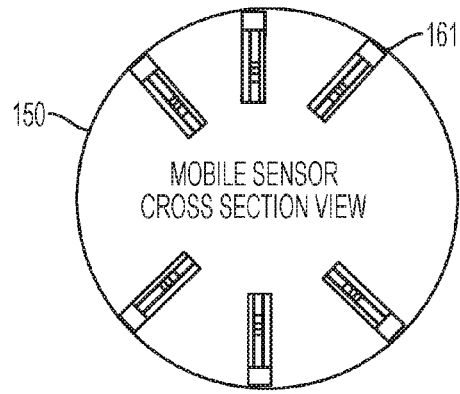
Figure 12:
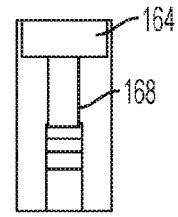

Another version of the anchor device 161 shown in FIGS. 11-12 utilizes an extendable (and collapsible) telescoping bar or rod 168 that can be extended (e.g., hydraulically, pneumatically, electrically, etc.). Therefore, as shown in FIGS. 7 and 11, one or more anchor devices 160, 161 of each self-propelled mobile transfer device 150 can connect to the interior surface of the pipe 100 in order to temporarily hold the self-propelled mobile transportation and transceiver device 150 at a fixed location within the pipe network 100.

Figure 13:
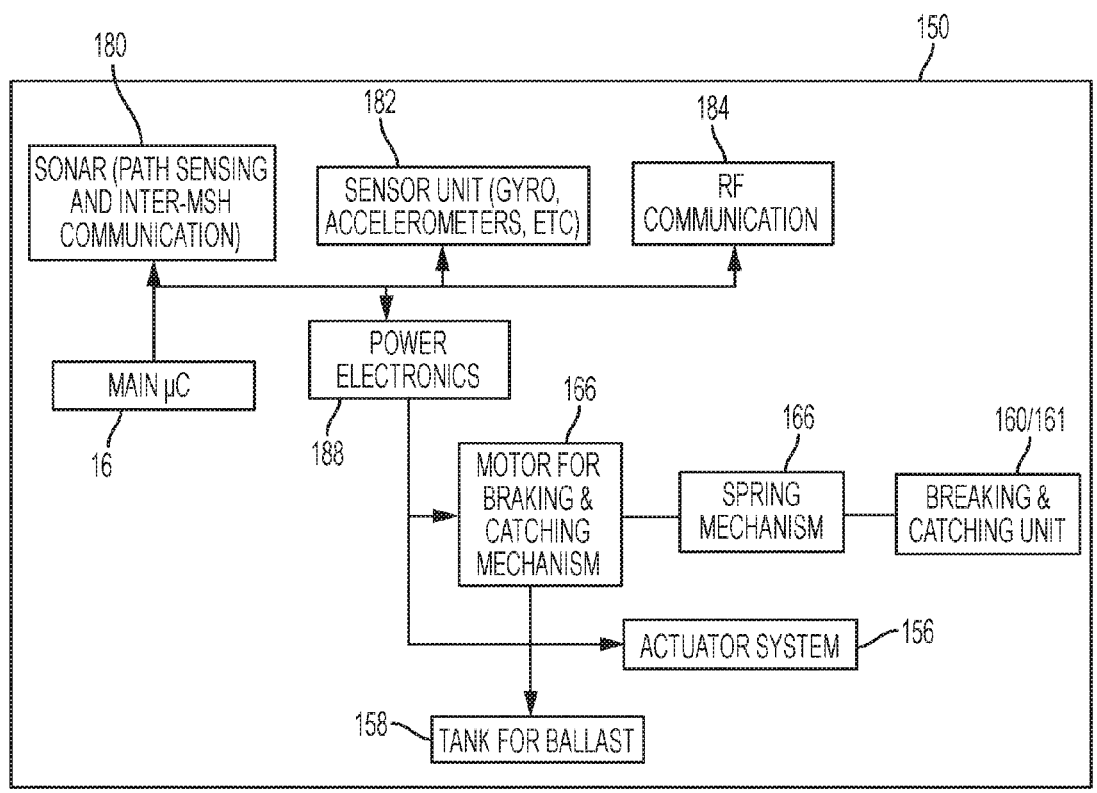

As shown in FIG. 13, the mobile device can also include an internal processor 16 and a transceiver (e.g., radio frequency (RF) communications device) 184 operatively connected to the processor 16 and power systems 188 (e.g., batteries, movement-based power generators, etc.). A sonar (path sensing and inter-device communications) device 180 and orientation sensor (gyro, accelerometers, etc.) device 182 can also be operatively connected to the processor 16 to permit the self-propelled mobile transportation and transceiver device 150 to determine its location and orientation (through dead reckoning, intra pipe landmark recognition, etc.). FIG. 13 also illustrates the motor and spool 166 of the anchor systems 160, 161, the ballast tanks 158, and the propulsion actuator systems 156.

The processor 16 can direct movement of the self-propelled mobile transportation and transceiver device 150, relative to the pipe network 100 and the sensors 110, 140, to optimize the amount of sensor data received and transmitted to the external receiver 130. The transceiver 184 can be in wireless communication with the sensors 110, 140 positioned within the pipe network 100 and in wireless communication with the external receiver 130. In specific implementations, the transceiver 184 wirelessly receives sensor data from the sensors 110, 140, the processor 16 aggregates the sensor data from multiple sensors 110, 140 to generate aggregated sensor data, and the transceiver 138 transmits the aggregated sensor data wirelessly to the receiver 130.

Figure 14:
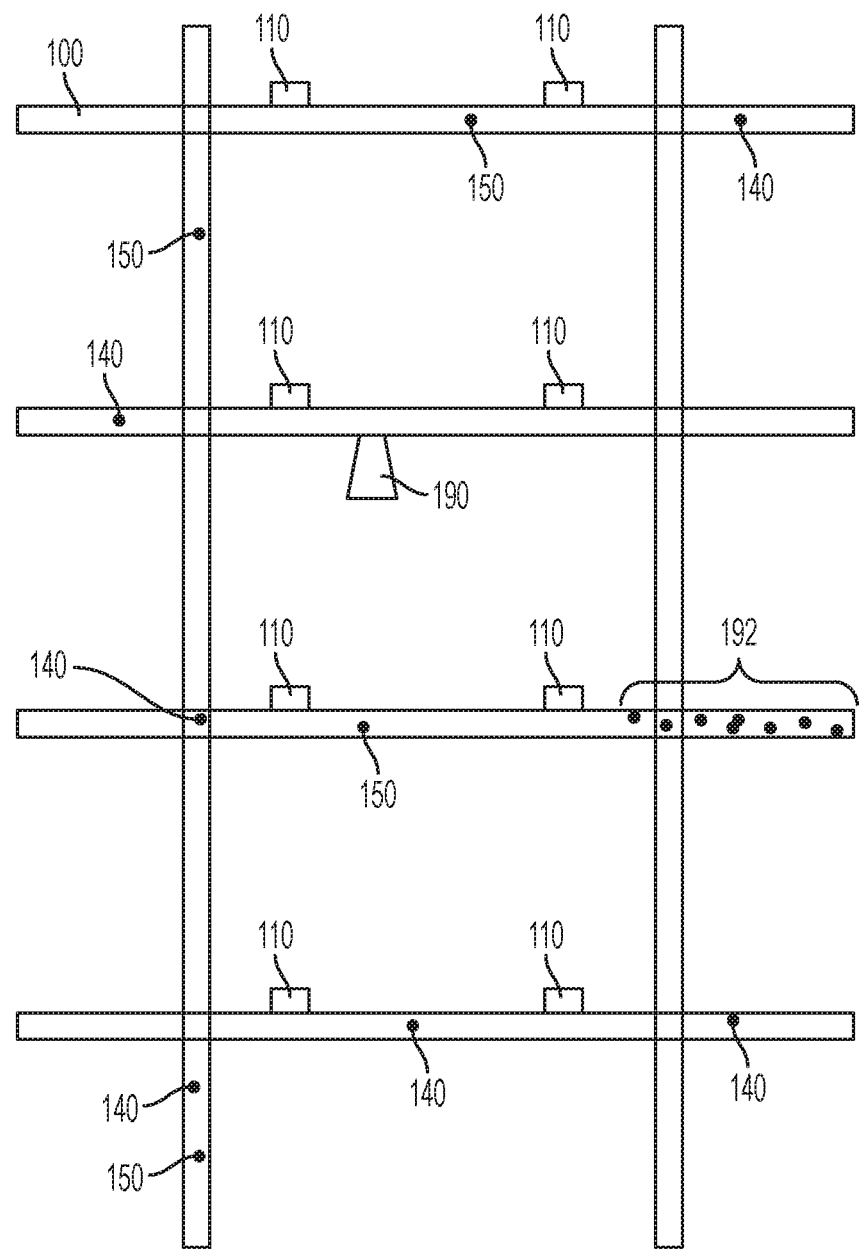

As noted above, the processor 16 or cloud devices 132 orchestrate the movement of multiple self-propelled mobile devices 150 and mobile sensors 140 in order to achieve the shortest time to transport mobile sensors to desired locations within the pipe network 100 (potentially against the flow of the substance 102), predict the most efficient routes for self-propelled mobile device based on historical data patterns, run diagnostics and maintenance of static sensors, enable fine grain diagnostics on static sensor points, and prevent the self-propelled mobile device from entering non-recoverable or inefficient sections of the pipe network 100. A very generalized example of this is shown in FIG. 14 where different fixed sensors 110 and mobile sensors 140 are located in the pipe network 100. In one example, fixed sensors 110 may detect a leak 190, and the processor 16 or cloud devices 132 may cause the self-propelled mobile devices 150 to move mobile sensors 140 away from, or toward, the leak 190. Similarly, in another example, many of the mobile devices may be in a single location 192 that may be caused by an obstruction or blockage, and the processor 16 or cloud devices 132 may cause the self-propelled mobile devices 150 to move mobile sensors 140 away from, or toward, that area 192. Those ordinarily skilled in the art would understand that the self-propelled mobile devices 150 can be used to move the mobile sensors 140 to any location within the pipe network for any goal, and that the foregoing is merely a very limited example.

Figure 15:
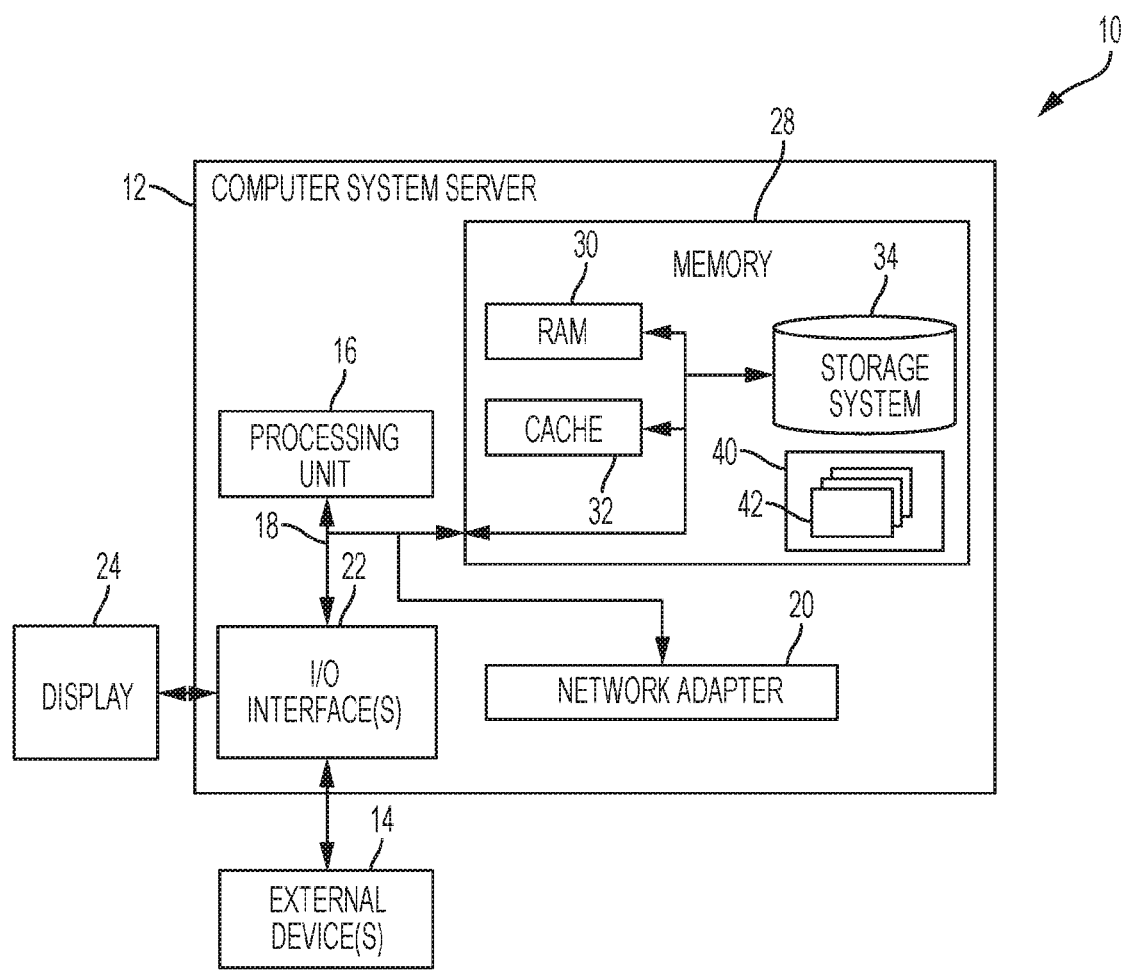
FIG. 15 is a schematic diagram illustrating computerized devices herein.

FIG. 15 illustrates various computer systems/servers 12 that can be used with any of the foregoing components and is described in the general context of a computer system that follows executable instructions, such as program modules. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Therefore, FIG. 15 illustrates the computer system/server 12 in a cloud computing node 10 and is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

In the drawings herein, the same identification numeral identifies the same or similar item. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device comprising:
an exterior;
a processor positioned internal to the exterior;
a transceiver positioned internal to the exterior and operatively connected to the processor;
an internal compartment and an opening providing access to the internal compartment, the internal compartment is sized to hold the sensors;
charging devices within the internal compartment, the charging devices recharging the sensors; and
a conveyor system within the internal compartment, the conveyor system moving the sensors within the internal compartment and controls the release of the sensors within the pipe network,
the transceiver is in wireless communication with sensors positioned within the a substance within the pipe network,
the exterior moves through the substance within the pipe network separately from the sensors within the pipe network,
the transceiver, within the exterior within the pipe network, is in wireless communication with a receiver external to the pipe network,
the transceiver, within the exterior within the pipe network, wirelessly sensor data from the sensors within the pipe network,
the processor, within the exterior within the pipe network, aggregates the sensor data from multiple ones of the sensors within the pipe network to generate aggregated sensor data, and
the transceiver, within the exterior within the pipe network, transmits the aggregated sensor data wirelessly to the receiver external to the pipe network.

2. The mobile device according to claim 1, wherein ones of the sensors are mobile sensors and move through the substance and the pipe network, the mobile sensors and the mobile device have at least one of different exterior shapes and different buoyancies, the different exterior shapes and different buoyancies cause the mobile sensors and the mobile device to travel differently within the same flow rate of the substance in the pipe network.

3. The mobile device according to claim 1, wherein ones of the sensors are mobile sensors and move through the substance and the pipe network, the mobile sensors and the mobile device have at least one of different exterior shapes and different buoyancies, the different exterior shapes and different buoyancies cause the mobile sensors to experience lower forces relative to the mobile device within the same flow rate of the substance in the pipe network.

4. The mobile device according to claim 1, further comprising a propulsion device, ones of the sensors are mobile sensors and move through the substance and the pipe network, the mobile sensors and the mobile device have at least one of different exterior shapes and different buoyancies, the different exterior shapes and different buoyancies cause the mobile device to travel at a higher speed when operating the propulsion device, relative to the mobile sensors operating a similar propulsion device, within the same flow rate of the substance.

5. The mobile device according to claim 1, further comprising a temporary anchor, the temporary anchor comprises a physical anchor temporarily attaching to the pipe network or a magnetic anchor temporarily attaching to the pipe network, and the temporary anchor selectively maintains the mobile device at a fixed location within the pipe network irrespective of flow of the substance.

6. The mobile device according to claim 1, wherein a processor is in communication with the mobile device through the receiver, the processor directs movement of the mobile device relative to the pipe network and the sensors to optimize an amount of the sensor data received and transmitted to the receiver.

7. A system comprising:
sensors positioned within a pipe network containing a substance;
a mobile transceiver device positioned within the pipe network, the mobile transceiver device moves through the substance and the pipe network separately from the sensors within the pipe network, the mobile transceiver device is in wireless communication with the sensors; and
a receiver external to the pipe network, the receiver is in communication with the mobile transceiver device,
the mobile transceiver device; within the pipe network; wirelessly receives sensor data from the sensors within the pipe network, and
the mobile transceiver device, within the pipe network, aggregates the sensor data from multiple ones of the sensors within the pipe network to generate aggregated sensor data,
the mobile transceiver device, within the pipe network, transmits the aggregated sensor data wirelessly to the receiver external to the pipe network,
the mobile transceiver device comprises;
an internal compartment and an opening providing access to the internal compartment, the internal compartment is sized to hold the sensors;
charging devices within the internal compartment, the charging devices recharging the sensors; and
a conveyor system within the internal compartment, the conveyor system moving the sensors within the internal compartment and controls the release of the sensors within the pipe network.

8. The system according to claim 7, ones of the sensors are mobile sensors and move through the substance and the pipe network, the mobile sensors and the mobile transceiver device have at least one of different exterior shapes and different buoyancies, the different exterior shapes and different buoyancies cause the mobile sensors and the mobile transceiver device to travel differently within the same flow rate of the substance in the pipe network.

9. The system according to claim 7, ones of the sensors are mobile sensors and move through the substance and the pipe network, the mobile sensors and the mobile transceiver device have at least one of different exterior shapes and different buoyancies, the different exterior shapes and different buoyancies cause the mobile sensors to experience lower forces relative to the mobile transceiver device within the same flow rate of the substance in the pipe network.

10. The system according to claim 7, ones of the sensors are mobile sensors and move through the substance and the pipe network, the mobile transceiver device comprises a propulsion device, the mobile sensors and the mobile transceiver device have at least one of different exterior shapes and different buoyancies, the different exterior shapes and different buoyancies cause the mobile transceiver device to travel at a higher speed when operating the propulsion device, relative to the mobile sensors operating a similar propulsion device, within the same flow rate of the substance.

11. The system according to claim 7, the mobile transceiver device comprises a temporary anchor, the temporary anchor comprises a physical anchor temporarily attaching to the pipe network or a magnetic anchor temporarily attaching to the pipe network, and the temporary anchor selectively maintains the mobile transceiver device at a fixed location within the pipe network irrespective of flow of the substance.

12. The system according to claim 7, further comprising a processor in communication with the mobile transceiver device through the receiver, the processor directs movement of the mobile transceiver device relative to the pipe network and the sensors to optimize an amount of the sensor data received and transmitted to the receiver.

13. A system comprising:
sensors positioned within a pipe network containing a substance;
a mobile transceiver device positioned within the pipe network, the mobile transceiver device moves through the substance and the pipe network separately from the sensors within the pipe network, the mobile transceiver device is in wireless communication with the sensors; and
a receiver external to the pipe network, the receiver is in communication with the mobile transceiver device,
the mobile transceiver device, within the pipe network, wirelessly receives sensor data from the sensors within the pipe network; and
the mobile transceiver device, within the pipe network, aggregates the sensor data from multiple ones of the sensors within the pipe network to generate aggregated sensor data,
the mobile transceiver device, within the pipe network, transmits the aggregated sensor data wirelessly to the receiver external to the pipe network, and
and the mobile transceiver device comprises:
an internal compartment and an opening providing access to the internal compartment, the internal compartment is sized to hold the sensors;
charging devices within the internal compartment, the charging devices recharging the sensors; and
a conveyor system within the internal compartment, the conveyor system moving the sensors within the internal compartment and controls the release of the sensors within the pipe network.

14. The system according to claim 13, ones of the sensors are mobile sensors and move through the substance and the pipe network, the mobile sensors and the mobile transceiver device have at least one of different exterior shapes and different buoyancies, the different exterior shapes and different buoyancies cause the mobile sensors and the mobile transceiver device to travel differently within the same flow rate of the substance in the pipe network.

15. The system according to claim 13, ones of the sensors are mobile sensors and move through the substance and the pipe network, the mobile sensors and the mobile transceiver device have at least one of different exterior shapes and different buoyancies, the different exterior shapes and different buoyancies cause the mobile sensors to experience lower forces relative to the mobile transceiver device within the same flow rate of the substance in the pipe network.

16. The system according to claim 13, ones of the sensors are mobile sensors and move through the substance and the pipe network, the mobile transceiver device comprises a propulsion device, the mobile sensors and the mobile transceiver device have at least one of different exterior shapes and different buoyancies, the different exterior shapes and different buoyancies cause the mobile transceiver device to travel at a higher speed when operating the propulsion device, relative to the mobile sensors operating a similar propulsion device, within the same flow rate of the substance.

17. The system according to claim 13, the mobile transceiver device comprises a temporary anchor, the temporary anchor comprises a physical anchor temporarily attaching to the pipe network or a magnetic anchor temporarily attaching to the pipe network, and the temporary anchor selectively maintains the mobile transceiver device at a fixed location within the pipe network irrespective of flow of the substance.

18. The system according to claim 13, further comprising a processor in communication with the mobile transceiver device through the receiver, the processor directs movement of the mobile transceiver device relative to the pipe network and the sensors to optimize an amount of the sensor data received and transmitted to the receiver.

\* \* \* \* \*